United States Patent [19]

Hall et al.

[11] Patent Number: 5,054,552

[45] Date of Patent: Oct. 8, 1991

[54] BREAKER SYSTEM FOR AQUEOUS FLUIDS CONTAINING XANTHAN GUMS

[75] Inventors: Bobby E. Hall, Houston; Clarita A. Szemenyei; D. V. Satyanarayana Gupta, both of The Woodlands, all of Tex.

[73] Assignee: The Western Company of North America, The Woodlands, Tex.

[21] Appl. No.: 575,986

[22] Filed: Aug. 31, 1990

[51] Int. Cl.$^5$ .............................................. E21B 43/04
[52] U.S. Cl. .................................... 166/278; 166/300; 252/8.551
[58] Field of Search ............... 166/276, 278, 280, 300; 252/8.551

[56] References Cited

U.S. PATENT DOCUMENTS

| | | | |
|---|---|---|---|
| 4,067,389 | 1/1978 | Savins | 166/300 X |
| 4,081,030 | 3/1978 | Carpenter et al. | 166/276 |
| 4,250,044 | 2/1981 | Hinkel | 252/8.551 |
| 4,506,734 | 3/1985 | Nolte | 166/300 X |
| 4,610,795 | 9/1986 | Norris et al. | 166/278 X |
| 4,647,385 | 3/1987 | Williams et al. | 252/8.551 |
| 4,895,207 | 1/1990 | Friedman et al. | 166/276 |
| 4,928,763 | 5/1990 | Falk | 166/300 X |
| 4,969,526 | 11/1990 | Cawiezel | 166/300 |

*Primary Examiner*—George A. Suchfield
*Attorney, Agent, or Firm*—Pravel, Gambrell, Hewitt, Kimball & Krieger

[57] ABSTRACT

This invention relates to the breaking of high viscosity aqueous fluids in which xanthan gum was used as a thickening agent. The invention provides a breaker system comprising two oxidizers, an organic acid, and two catalysts. The invention is particularly useful in oil field operations such as placement of a gravel pack or distribution of a proppant in a fractured formation.

7 Claims, No Drawings

BREAKER SYSTEM FOR AQUEOUS FLUIDS CONTAINING XANTHAN GUMS

BACKGROUND OF THE INVENTION

1. Field of the Invention

This invention relates to "breaking" of high viscosity fluids containing xanthan gums which are used in industrial and oil field operations. Breaking refers to an intentional reduction in the viscosity of a high viscosity fluid.

In a number of industrial and oil field operations, there is a need for a fluid with an initial high viscosity to suspend particulate matter and a final low viscosity to permit the suspended matter to settle out. The fluid's viscosity must be able to be intentionally and controllably reduced such that the suspended matter will settle out when desired.

2. Description of the Related Art

In oil field operations, there are several uses for high viscosity fluids which may subsequently be converted into low viscosity fluids. A high viscosity fluid has a greater propensity to keep insoluble, particulate matter suspended therein. If this fluid's viscosity is substantially lowered, the suspended particles will settle out.

In the oil field, there are several operations in which a fluid's ability to initially hold and later drop this suspended particulate matter is beneficial. These operations include the placement of gravel packs in well completion operations, the placement of proppants in a formation after the fracturing of the formation, and other applications, such as drilling fluids. For most of these operations, and especially in gravel pack and fracturing operations, it is also important to minimize gel residue once the gel is broken.

In industry, there exist several uses for a fluid which has a viscosity that can be controllably altered. These uses include transporting particulate matter, such as coal particles or mineral ore particles, through pipelines by suspending the particles in a slurry.

Polysaccharides have been particularly useful in functioning as a thickener for aqueous fluids. There are several related processes for breaking thickened aqueous fluids containing polysaccharides. In U.S. Pat. No. 4,647,385, a combination of an alkali metal or alkaline earth metal salt of hypochlorous acid and a water-soluble tertiary amine is used as a breaker for aqueous fluids containing polysaccharides as well as other thickeners including water-soluble derivatives of cellulose and synthetic water-soluble polymers. U.S. Pat. Nos. 4,250,044 and 4,560,486 discuss a breaker for aqueous fluids containing polysaccharides which combines a water-soluble tertiary amine and at least one compound selected from the group consisting of ammonium persulfates and alkali metal persulfates. While these breakers are effective on most polysaccharide thickeners, such as guar gum, hydroxypropyl guar and locust bean gum, they are not particularly effective on xanthan gum thickeners. When these breakers are applied to aqueous solutions containing xanthan gum thickeners, they are not as effective in that they do not effect a clean break. Also, when these breakers are used on xanthan gums, the degree of breaking performance cannot be controlled. Accordingly, there exists a need for improving breaker systems used on xanthan gum thickeners.

SUMMARY

This invention comprises a breaker system for xanthan gum thickeners wherein a combination of at least two oxidizers, an organic acid, and at least two catalysts is used as a breaker for high viscosity aqueous fluids containing xanthan gum. In a preferred embodiment of the invention the oxidizers are sodium percarbonate and ammonium persulfate, the organic acid is citric acid, and the catalysts are a soluble iron salt and a tertiary amine. With this invention, xanthan gum is used to form a high viscosity aqueous fluid in which particulate matter can be suspended. Later, a breaker comprising at least two oxidizers, an organic acid and at least two catalysts is added to the fluid. This breaker reduces the viscosity of the fluid and permits the suspended particles to settle out in an effective and readily controllable manner.

This breaker system is particularily useful in oil field operations, such as the drilling and treatment of oil and gas wells. This improved method of breaking xanthan gums and controlling the rate of viscosity reduction will make several oil field operations, such as the placement of gravel packs in well completion operations and the placement of proppants in fracturing operations, more cost effective and operable.

DETAILED DESCRIPTION OF THE INVENTION

Breaker systems for aqueous fluids containing various polysaccharides are relatively well known. However, such systems have been found to be particularly ineffective in the breaking of xanthan gum thickeners. This invention provides for an effective and readily controllable breaker system for thickened aqueous solutions containing xanthan gums. This breaker system not only allows the rate of viscosity reduction to be controlled, but it also provides a more complete break of the gel so as to leave considerably less gel residue.

In oil field operations, thickened gels are commonly used for gravel packing and fracturing. In gravel packing, the gel and suspended particles are injected into the formation at a matrix rate. When the operation is completed, the gel is broken and the particles settle out. This operation helps prevent the migration of fines into the wellbore. In fracturing operations, the gel and suspended particles (proppant) are injected into the formation at a rate sufficient to fracture the formation. When the proppant is in place, the gel is broken and the proppant provides a permeable channel for oil and gas to migrate to the wellbore.

In this invention, water-soluble xanthan gum is first dissolved in an aqueous medium such as, for example, fresh water, brine or sea water for the purpose of creating a high viscosity or thickened aqueous fluid which will suspend particulate matter. At the appropriate time, the breaker of this invention, which includes a mixture of at least two oxidizers, an organic acid, and at least two catalysts, is added to the circulating high viscosity aqueous fluid. Then, particulate matter such as, for example, sand, gravel or proppant, is added to the fluid, and this system is circulated through or injected into downhole formations. This breaker causes a reduction in the viscosity of the thickened aqueous solution containing xanthan gum, and particulate matter settles out of solution thereby producing the desired gravel pack or proppant distribution. The length of time it takes for the thickened fluid to break, as well as the final viscosity upon breaking, may be controlled by varying the amount of the individual components in the breaker system. Varying each component will have an effect on the performance of the breaker system so individualized results can be achieved upon each use of the breaker system. It has been observed that varying the amount of the organic acid has the most notable effect on the breaker system. The optimum breaker system for any particular job can be readily determined by routine experimentation in the lab.

Other breaker systems previously used on high viscosity aqueous fluids containing xanthan gums were not effective in breaking the gel, both in terms of break time and final viscosity. Furthermore, even when the aqueous fluid was broken, a high level of residue from the xanthan gum remained in the formation. However, the combination of the components in the inventive breaker system, namely at least two oxidizers, an organic acid and at least two catalysts, effects a fast, efficient and clean breaking of thickened fluids containing xanthan gum. As shown in Example 1, all of the components of the breaker system must be present for the breaker system to work effectively.

In a preferred embodiment of the invention, the oxidizers are sodium percarbonate and ammonium persulfate, the organic acid is citric acid, and the catalysts are a soluble iron salt and a tertiary amine. The preferred soluble iron salt is ferrous ammonium sulfate, and the preferred tertiary amine is the ethylene diamine tetracetic acid (EDTA).

EXAMPLE 1

A thickened aqueous solution was prepared by dissolving 36 lb. of xanthan gum in 1000 gallons of water. After a short period, the fluid had an initial viscosity of 19 cp. To this solution, the breaker system components were added as shown in Table 1.

TABLE 1

XANTHAN GEL VISCOSITY WITH VARYING COMPONENTS IN BREAKER SYSTEM - VISCOSITY AFTER 8 HOURS AT 120°F.

| Sample # | Ammonium Persulfate (lbs) | Sodium Percarbonate (lbs) | Citric Acid (lbs) | Catalyst[a] (%) | Viscosity[b] (cp) |
|---|---|---|---|---|---|
| 1 | 5 | — | — | — | 15 |
| 2 | — | 5 | — | — | 17 |
| 3 | 2.5 | 2.5 | — | — | 17 |
| 4 | 2.5 | 2.5 | 2.5 | — | 16 |
| 5 | 2.5 | 2.5 | — | 1 | 16 |
| 6 | 2.5 | 2.5 | 2.5 | 1 | 10 |

[a]A prior study of catalysts, using ferrous ammonium sulfate and ethylene diamine tetracetic acid, showed that both catalysts were required for an effective break.
[b]For the purpose of this study, a viscosity of 10 cp. or less is considered broke.

The thickened aqueous solution is generally prepared by mixing about 0.4 wt. % xanthan gum with an available water source. In the trade, the amount of xanthan gum that is used is generally expressed as pounds per 1000 gallons of solution. Expressed in this manner, the typical amount of xanthan gum will be about 40 pounds per 1000 gallons of solution. However, the amount of xanthan could vary from about 10 to about 100 pounds per 1000 gallons of solution.

The preferred embodiment of the breaker system for each 1000 gallons of thickened solution containing xanthan gum comprises the following components: from about 0.1 to about 100 pounds of ammonium persulfate, from about 0.1 to about 100 pounds of sodium percarbonate, from about 10 to about 200 pounds of citric acid, from about 0.1 to about 5 pounds of ferrous ammonium sulfate, and from about 0.5 to about 50 pounds of ethylene diamine tetracetic acid and/or its salts. The exact ratio of each component to be used will depend on the particular job. However, for most operations the ratios specified in sample #6 in Table 1 will be especially preferred.

While the specified components are preferred, it is understood that other compounds could be substituted. For example, other organic acids include fumaric acid, glycolic acid, salicylic acid, malaic acid and acetic acid; other soluble iron salts may be selected from the group of ferrous chlorate, ferrous acetic, ferrous bromide, ferrous perchlorate, ferrous formate, ferrous iodide, ferrous nitrate and ferrous tartarate; and other tertiary amines which may be used are triethanolamine, dimehylaminopropionitrile, phenanthroline, N-methylmorpholine, N,N dimethylbenzylamine and pyridine.

With the inventive breaker system, the degree of performance can be controlled by varying the amount of the components, in particular the amount of citric acid and oxidizer. As shown in Example 2, the length of time for the high viscosity fluid to break may be increased by increasing the amount of acid in the breaker mixture.

EXAMPLE 2

A thickened aqueous solution containing xanthan gum was prepared as in Example 1. The initial viscosity of the fluid was 19 cp. The amount of acid was varied to determine the effect upon break time.

TABLE 2

EFFECT OF ACID QUANTITY ON BREAK TIME

| Sample # | Temperature (°) | Oxidizer[a] (lbs.) | Citric Acid (lbs.) | Catalyst[b] (%) | Break Time (hours) | Viscosity (cp) |
|---|---|---|---|---|---|---|
| 1 | 100 | 40 | 25 | 1 | 4 | 2 |
| 2 | 100 | 40 | 50 | 1 | 5.5 | 11 |
| 3 | 100 | 40 | 75 | 1 | 20 | 1 |
| 4 | 120 | 6 | 25 | 1 | 8 | 8 |
| 5 | 120 | 6 | 50 | 1 | 8 | 12 |
| 6 | 120 | 6 | 75 | 1 | 8 | 13 |
| 7 | 140 | 5 | 25 | 1 | 5 | 3 |
| 8 | 140 | 5 | 50 | 1 | 5 | 6 |
| 9 | 140 | 5 | 75 | 1 | 6 | 8 |

[a]Containing equal amounts of the oxidizers, ammonium persulfate and sodium percarbonate.
[b]1 gram ferrous ammonium sulfate in 100 cc of water containing 5 grams of tetrasodium EDTA.

The above examples are intended to illustrate the invention as described above and claimed hereafter and are not intended to limit the scope of the invention.

The principle of the invention and the best mode contemplated for applying that principle have been described. It is to be understood that the foregoing is illustrative only and that other means and techniques can be employed without departing from the true scope of the invention defined in the following claims.

We claim:

1. A process for gravel packing a well by injecting particles suspended in a thickened aqueous carrier fluid into the well and into contact with the formation at a matrix rate, said aqueous carrier fluid comprising:
   (a) an aqueous liquid,
   (b) as a thickening agent to increase the viscosity of the aqueous liquid, a viscosity increasing amount of xanthan gum, and
   (c) as a breaker to reduce the viscosity of the fluid after the fluid has served its intended purpose as a carrier fluid, the combination comprising an effective amount of a mixture of at least two oxidizers, an organic acid, and at least two catalysts.

2. The process of claim 1 wherein the oxidizers are sodium percarbonate and ammonium persulfate.

3. The process of claim 1 wherein the organic acid is citric acid.

4. The process of claim 1 wherein the catalysts are a soluble iron salt and a tertiary amine.

5. The process of claim 4 wherein the soluble iron salt is ferrous ammonium sulfate.

6. The process of claim 4 wherein the tertiary amine is ethylene diamine tetraacetic acid.

7. The process of claim 1 wherein the breaker comprises per 1000 gallons of thickened aqueous fluid from about 0.1 to about 100 pounds of ammonium persulfate as one of the at lest two oxidizers, from about 0.1 to about 100 pounds of sodium percarbonate as one of the at least two oxidizers, from about 10 to about 200 pounds of citric acid as the organic acid, from about 0.1 to about 5 pounds of ferrous ammonium sulfate as one of the at least two catalysts, and from about 0.5 to about 50 pounds of ethylene diamine tetraacetic acid and/or its salts as one of the at least two catalysts.

* * * * *